United States Patent [19]

Hayami et al.

[11] 4,072,958
[45] Feb. 7, 1978

[54] INK INJECTION TYPE WRITING SYSTEM USING AMPLITUDE-MODULATED ELECTRICAL SIGNALS

[75] Inventors: Heijiro Hayami; Hiroyoshi Tsuchiya; Kunio Yoshida; Yukifumi Tsuda; Yoshimitsu Kanno, all of Kawasaki, Japan

[73] Assignee: Matsushita Electric Industrial Co., Ltd., Japan

[21] Appl. No.: 673,132

[22] Filed: Apr. 2, 1976

[30] Foreign Application Priority Data

Apr. 11, 1975 Japan .................................. 50-44613

[51] Int. Cl.² ............................................. G01G 15/18
[52] U.S. Cl. .............................. 346/140 R; 358/280; 358/296
[58] Field of Search ............. 346/140 R, 75; 358/280, 358/281, 296, 298, 299, 302, 303

[56] References Cited

U.S. PATENT DOCUMENTS

| | | | |
|---|---|---|---|
| 2,512,743 | 6/1950 | Hansell | 346/140 X |
| 3,249,690 | 5/1966 | Schubert | 358/280 |
| 3,747,120 | 7/1973 | Stemme | 346/140 X |
| 3,828,357 | 8/1974 | Koeblitz | 346/140 |

*Primary Examiner*—Joseph W. Hartary
*Attorney, Agent, or Firm*—Robert E. Burns; Emmanuel J. Lobato; Bruce L. Adams

[57] ABSTRACT

An ink ejection system of the invention includes an electrical circuit generating sinusoidal wave pulses and a liquid applying unit operable to discharge the liquid in pulsed jets in response to the sinusoidal wave pulses. The circuit comprises means for generating a sinusoidal signal of constant amplitude and frequency higher than the highest instantaneous frequency of a video signal, and means for modulating the amplitude of the sinusoidal signal in accordance with the video signal to generate a signal containing no harmonic components.

7 Claims, 19 Drawing Figures

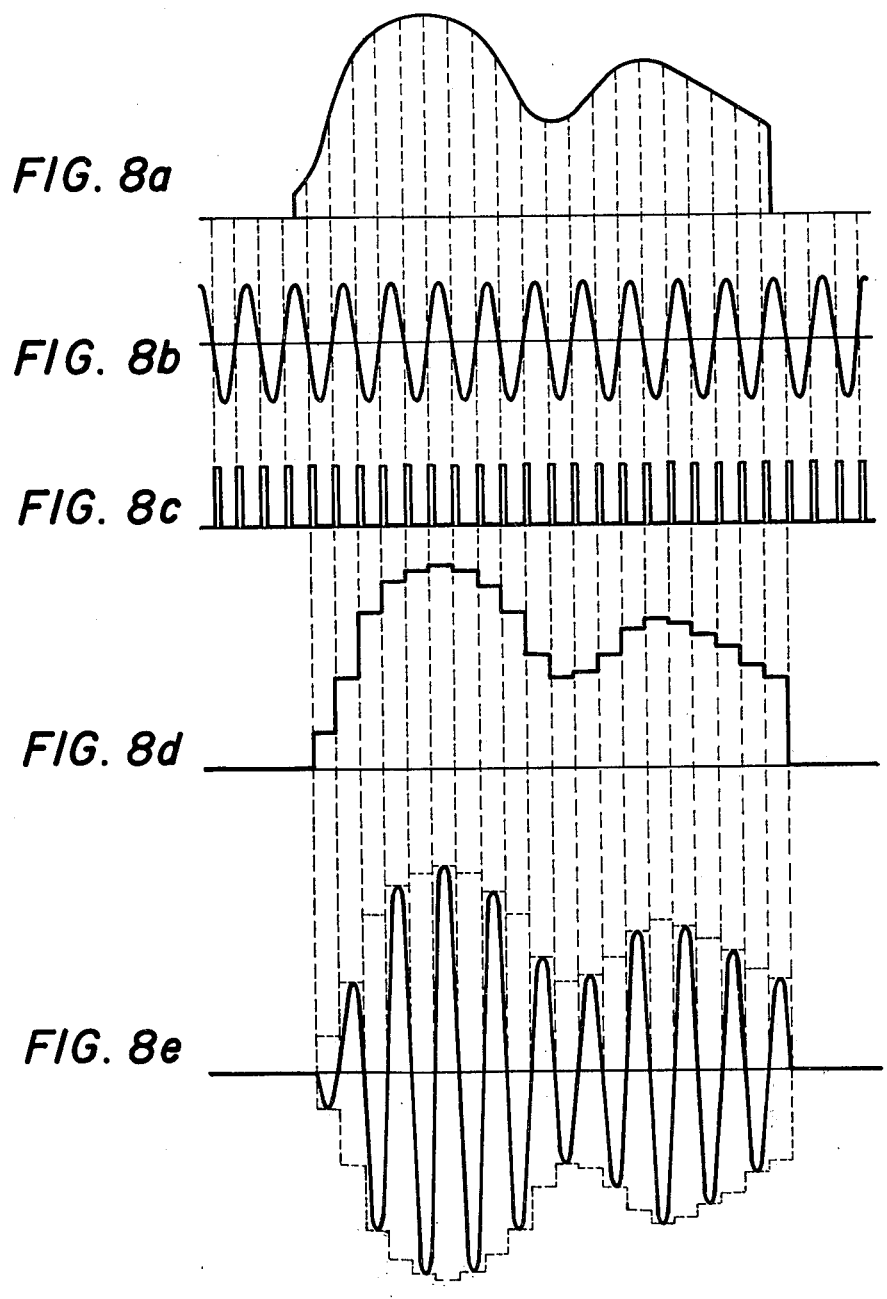

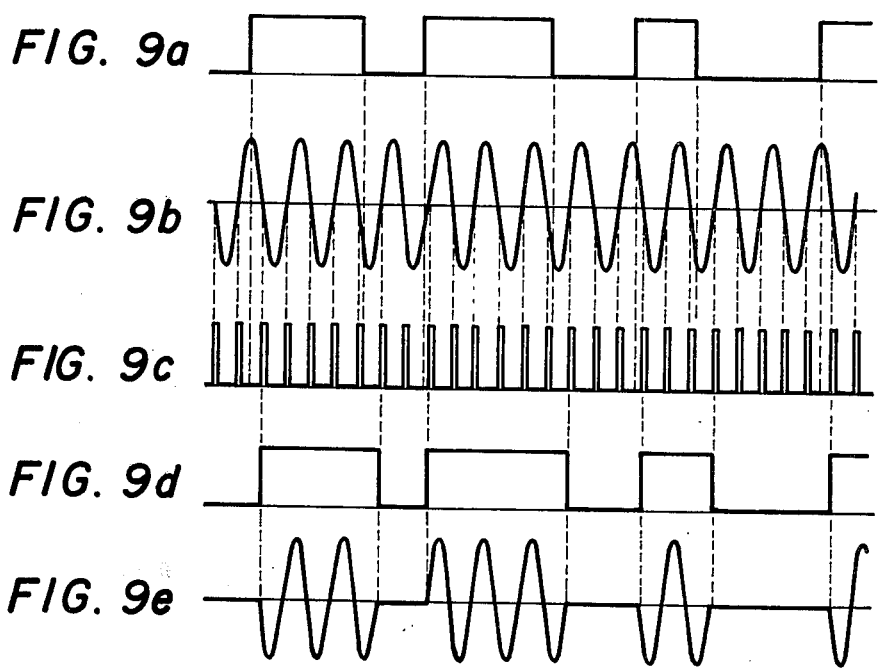

INK INJECTION TYPE WRITING SYSTEM USING AMPLITUDE-MODULATED ELECTRICAL SIGNALS

BACKGROUND OF THE DISCLOSURE

The present invention relates generally to ink ejection type writing systems, and more particularly to an ink ejection system comprising a liquid applying or writing unit and an electrical circuit for driving the unit with a high frequency signal which is free from harmonics.

Because of the high speed capability of the ink ejection type writing mechanism, many proposals have been made in which the liquid is discharged onto the paper by application of electrical pulses, the liquid being ejected in a series of pulsed jets. The speed of the writing unit is not only determined by the capability of the liquid responding to the rapidly occurring electrical pulses, but also determined by the waveform of the electrical pulses.

SUMMARY OF THE INVENTION

An object of the invention is to provide an ink ejection system which provides a sinusoidal signal amplitude-modulated by a video signal that permits reproduction of a sharply defined image.

According to the general aspect of the invention, there is provided an ink ejection system comprising a writing unit including a chamber, an inlet channel for supplying the chamber with liquid, an outlet channel, and an electromechanical transducer for generating pressure rises in the liquid in the chamber to discharge the liquid in the form of droplets through the outlet channel to a surface, and an electrical circuit for generating signals with which the transducer is excited to generate the pressure rises, the circuit including, means for generating a sinusoidal signal of constant amplitude and frequency higher than the highest instantaneous frequency of a video signal, and means for modulating the amplitude of the sinusoidal signal in accordance with the video signal.

According to a specific aspect of the invention, there is provided an ink ejection system comprising a writing unit including a chamber, an inlet channel for supplying the chamber with liquid, an outlet channel, and an electromechanical transducer for generating pressure rises in the liquid in the chamber to discharge the liquid in a series of droplets through the outlet channel onto a surface, and an electrical drive circuit for generating signals with which the transducer is excited to generate the pressure rises, the circuit including means for generating a sinusoidal signal of constant amplitude and frequency higher than the highest instantaneous repetition frequency of the video signal, means for generating a sampling signal in step with a predetermined phase of the sinusoidal signal, sample-and-hold circuit means operable to sample the instantaneous value of the video signal with said sampling signal and to hold the sampled video signal until the next sampling signal occurs, and means for modulating the amplitude of the sinusoidal signal in accordance with the output pulse.

The sampling pulse is preferably in step with a zero crosspoint of the sinusoidal waveform so that the amplitude-modulated signal starts from and ends at the zero voltage level even when the video signal possesses digital characteristic so that sharply defined images can result.

BRIEF DESCRIPTION OF THE DRAWINGS

The invention will be described by way of example in the following description with reference to the accompanying drawings, in which:

FIGS. 8a–e and 9a–e are waveform diagrams of the signals appearing in the circuit of FIG. 4.

DESCRIPTION OF THE PREFERRED EMBODIMENTS

Figure 1:
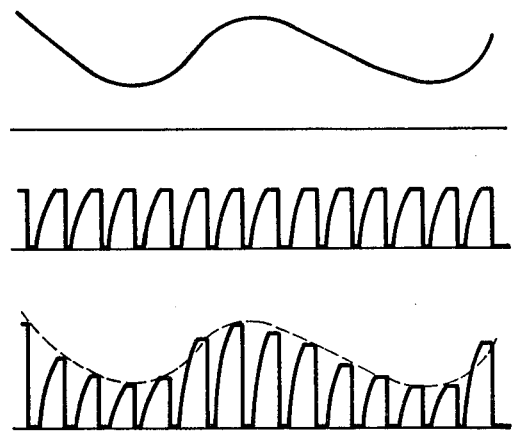
FIG. 1 illustrates a series of waveforms used in a prior art system.
Figure 2:
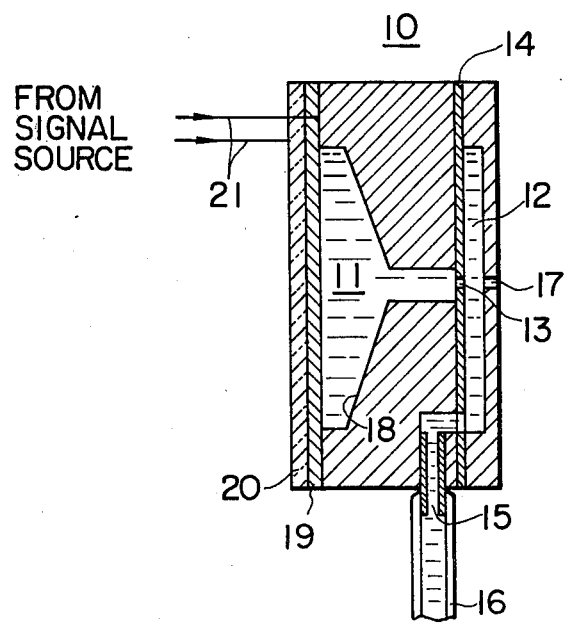
FIG. 2 is a view in cross-section of a writing unit employed in the ink ejection system of the invention.

Before describing the embodiments of the present invention, reference is first had to FIG. 1 in which a series of signal waveforms used in a prior art ink ejection system is shown. In the prior art system, an analog video signal (FIG. 1a) was used to amplitude modulate the waveform of a signal having an exponentially rising slope at the leading edge and a sharply falling trailing edge as shown in FIG. 1b. The modulated signal waveform shown in FIG. 1c was used to operate an ink ejection writing unit 10 (FIG. 2) which comprises a first or inner chamber 11 and a second or outer chamber 12 connected thereto by a connecting channel 13 provided in a dividing plate 14, an inlet channel 15 which is connected to an ink reservoir or container (not shown) through conduit 16, and an outlet channel 17 connected to the outer chamber 12 in alignment with the connecting channel 13 in the axial direction of the unit 10. The inner chamber 11 is defined by a funnel shaped inner wall 18 and a metal membrane 19 in face-to-face contact with a piezoelectric element or membrane 20 which forms therewith an electromechanical transducer coupled to an electrical circuit (not shown) through a pair of input leads 21. The transducer, when energized by the input signal, will generate pressure rises in the liquid in the inner chamber 11 in response to the short duration pulses. The pressure rises in the inner chamber 11 are transmitted through the connecting channel 13 to the outer chamber 12, the liquid therein being expelled through the outlet channel 16 to outside of the unit in the form of pulsed jets. However, at the instant the input voltage drops sharply at the trailing edge, a series of small droplets so-called "after jet" tend to form that follow the main droplet, thereby causing a blurring of image when deposited successively on a surface. At the trailing edge of a drive pulse, the pressure in the liquid in inner chamber 11 rapidly falls to pull in the liquid into outer chamber 12, which may cause air to be sucked into the outer chamber 12 at larger input voltages to thereby form bubbles therein. Furthermore, mechanical resonance will occur at one of the harmonics of the input voltage, which in turn will cause instability in the stream of jets. The unit 10 is mounted as a writing head in facsimile equipment so that its outlet channel 17 is positioned with respect to the surface of a sheet of paper rolled on a conventional revolving drum and moved in a direction perpendicular to the direction of scanning by the width of a line at the end of each line scan.

Figure 3:
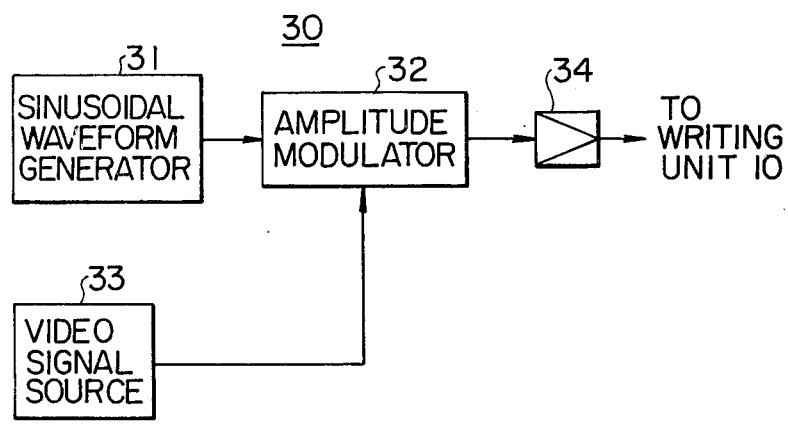
FIG. 3 is a circuit block diagram of a first embodiment of the invention.

Referring to FIG. 3, a signal generating circuit 30 for driving the writing unit 10 in accordance with the invention is shown in schematic diagram. A sinusiodal waveform generator 31 generates a constant amplitude sinusoidal alternating voltage at a frequency of the order of 20 kHz and feeds it to an amplitude modulator 32 of conventional design. Video signal source 33 is provided to generate, preferably, a continuous wave signal that varies in amplitude in accordance with the densities of a continuous tone image to be reproduced. The modulator 32 is fed with the video signal from the source 33 to amplitude modulate the signal from generator 31 in conventional manner. The amplitude-modulated sinusoidal signal conveying the video information contains no harmonics and is applied to the transducer of unit 10 through amplifier 34. Because of the continuum of the drive signal, there is no sudden pressure decreases in the liquid in the chambers 11 and 12 of until 10, and thus no "after jet" will be produced.

A binary video signal may also be employed with the resultant introduction of a certain degree of harmonics to the amplitude modulated video signal at the leading and trailing edges of the modulating video pulses. However, this introduction of harmonics can result in lesser degree of "after jet" as compared to the prior art system in which the "after jet" stream contaminates the trailing edge of each discrete image area to such an extent that prevents the practical use of the system.

Figure 4:
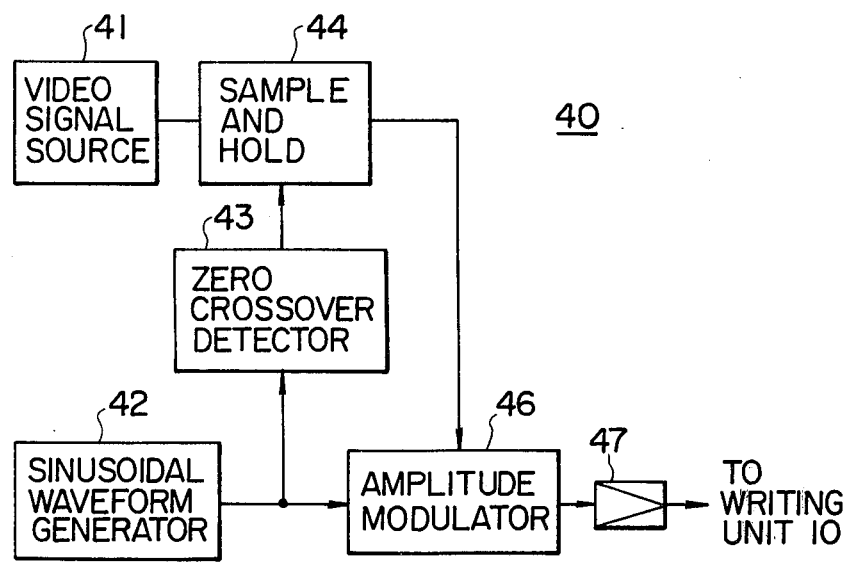
FIG. 4 is a circuit block diagram of a second embodiment of the invention.

FIG. 4 illustrates a second embodiment of the invention, in which a signal generating circuit 40 comprises a video signal source 41 as obtained from a transmitter station (not shown) and a sinusoidal waveform generator 42. The video signal from source 41 varies in amplitude in accordance with the density of elemental areas of the original image and contains steep transitions in amplitude that corresponds to sharply defined high density image areas against the white background, so that the signal possesses both analog and digital characteristics as illustrated in FIG. 8a. The signal from generator 42 is a constant amplitude sinusoidal alternating voltage at a frequency of the order of 20 kHz (FIG. 8b). A zero crossover detector 43 is connected to sinusoidal wave generator 42 to detect the zero crossing point of the sinusoidal waveform to produce a sampling pulse in response thereto. (FIG. 8c). This sampling pulse is fed to a sample-and-hold circuit 44 which is operable in the sample mode when it receives the sampling pulse and changes to the hold mode after the input signal is sampled. The instantaneous value of the video signal is thus sampled and held until the next sampling pulse occurs so that an output waveform as shown in FIG. 8d is produced. The output from the sample-and-hold circuit 44 is phase-corrected so that the leading and trailing edges are in step with the zero crosspoints of the sinusoidal signal. Since the frequency of the sinusoidal signal is much higher than the highest possible instantaneous frequency of the video signal, the difference between the relative phases of the video signal (FIG. 8a) and the phase-corrected signal (FIG. 8d) is negligible. The output from sample-and-hold circuit 44 is applied to an amplitude modulator 46 to amplitude modulate the sinusoidal signal supplied from generator 42 to produce an output waveform shown in FIG. 8e. Even when the video signal possesses digital characteristic the amplitude-modulated output starts from and ends at the zero voltage level at the leading and trailing edges, and thus it is appreciated that there is no harmonic component in the drive signal, which after amplification at 47 is applied to the writing unit 10.

Figure 5:
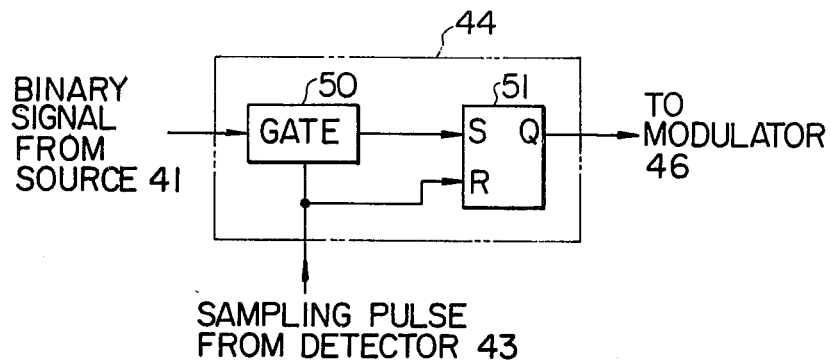
FIG. 5–7 are circuits illustrating variations of the circuits used in the embodiment of FIG. 4.
Figure 6:
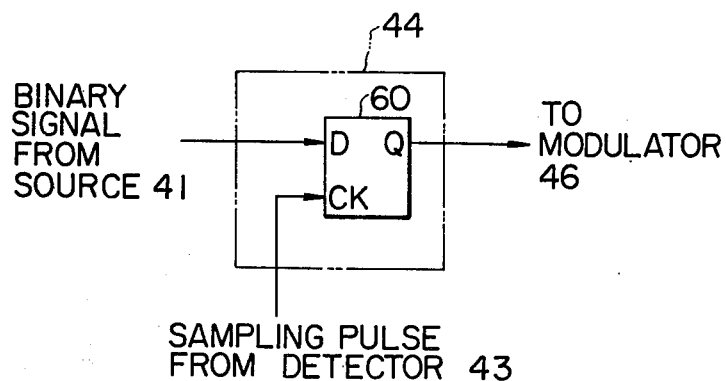

It is also possible to drive the writing unit 10 with a pure digital video signal as shown in FIG. 9a. In this instance, the sample-and-hold circuit 44 may comprise a gate circuit 50 having its input connected to the video signal source 41 which supplies it with binary video signal and its output connected to the set input of a set-preference type bistable device or flip-flop 51 (FIG. 5). Sampling signals (FIG. 9c) from zero crossover detector 43 are connected to the control gate of gate 50 and also to the reset input of flip-flop 51. The gate 50 passes the high level binary signal from source 41 during a sampling pulse from detector 43 and sets the output Q of bistable 51 high. The Q output stays high until the bistable 51 is reset by a sampling pulse which occurs during the low condition of the input video signal. The output pulse (FIG. 9d) from flip-flop 51 is used to modulate the amplitude of the sinusoidal signal (FIG. 9b) to generate a train of bursts (FIG. 9e). Alternatively, the sample-hold 44 may be embodied in a circuit shown in FIG. 6 which includes a conventional D-type flip-flop 60 having its data input connected to the binary signal source 41 and its clock input connected to the detector 43. The flip-flop 60 changes to the binary state of the signal on the data input only when the sampling pulse is delivered from detector 43.

Figure 7:
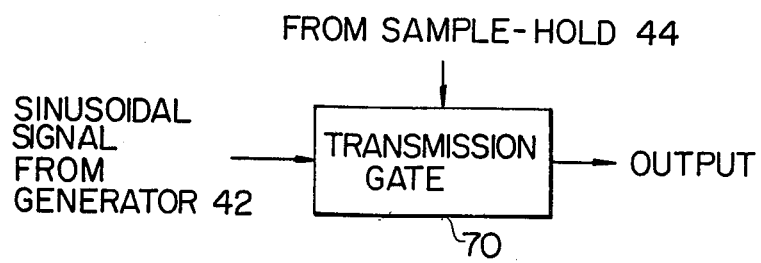

The foregoing description shows only preferred embodiments of the present invention. Various modifications are apparent to those skilled in the art without departing from the scope of the present invention. For example, the amplitude modulator 46 of signal generator 40 may be replaced by a bidirectional transmission gate 70 as illustrated in FIG. 7 which is gate-controlled by the output from the sample-hold 44 to pass the sinusoidal signal from generator 42 to the writing unit 10 via amplifier 47. Therefore, the embodiments shown and described are only illustrative, not restrictive.

Figure 10A:
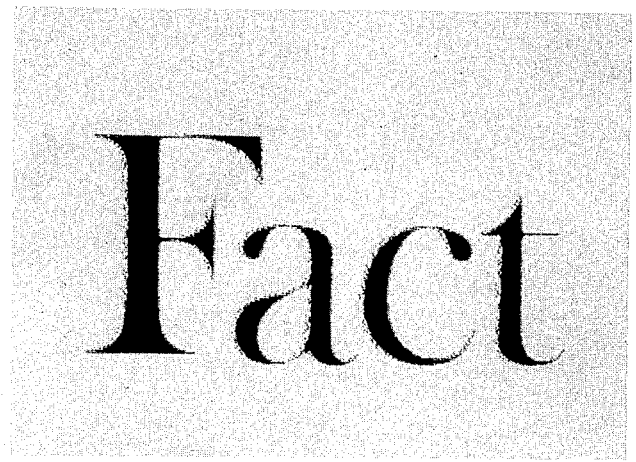
FIGS. 10a and 10b are photographs of reproduced images.
Figure 10B:
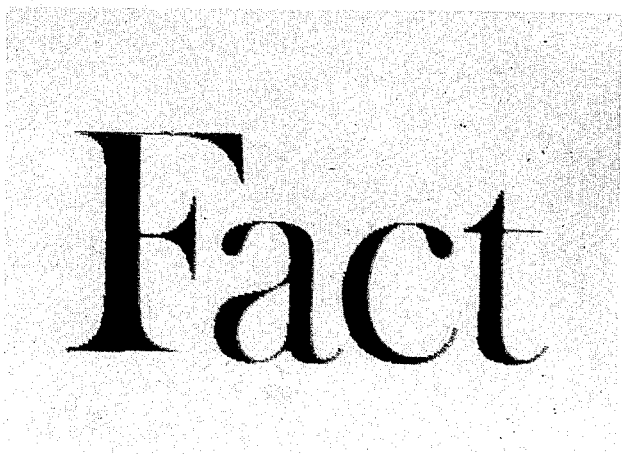

For comparison purposes, FIG. 10 shows a reproduction of the original black-and-white discrete images. FIG. 10a is a photograph of the resultant images using the circuit of FIG. 3 in which the sinusoidal signal is modulated with binary video signals. It is seen that as the drive signal changes from the high to low binary states, the reproduced images tend to produce a certain degree of trail at the edge thereof due to the "after jet" effect as mentioned previously. This trailed portion of the image is premissible for some applications where strict image resolution is not required. FIG. 10b is a photograph of the images resulting from the use of the circuit of FIG. 4. It is clearly seen that the reproduced images are sharply defined.

What is claimed is:

1. An ink ejection system comprising a writing unit including a chamber, means defining an inlet channel connected in use to a source of liquid for introducing the liquid into the chamber, means defining an outlet channel connected to the chamber, and an electromechanical transducer for generating pressure rises in the liquid in the chamber to discharge the liquid in a series of droplets through the outlet channel onto a surface, means for generating an alternating sinusoidal signal of constant amplitude and frequency higher than the highest instantaneous frequency of a video signal, means for detecting a zero crossover point of said alternating signal, and generating a sampling signal in step with each zero crossover point, sample-and-hold circuit means effective to sample the instantaneous value of the video signal in response to said sampling signal and to hold the sampled video signal until the next sampling signal occurs, and means for modulating the amplitude of the sinusoidal alternating signal in accordance with the output from the sample-and-hold circuit means.

2. An ink ejection system as claimed in claim 1, wherein said video signal is a binary signal, and wherein said sample-and-hold circuit means comprises a bistable device having a first input arranged to receive the binary video signal and a second input arranged to receive the sampling signal and operable to change to the binary state of the signal on the first input when the sampling signal occurs to thereby generate an output pulse whose leading and trailing edges are in step with said predetermined phase of the sinusoidal signal.

3. An ink ejection system as claimed in claim 2, wherein said bistable device comprises a gate-controlled conducting device arranged to pass the binary signal in response to said sampling signal, and a flip-flop having a first input receptive of the passed binary signal and a second input receptive of the sampling signal and operable to change to a first binary state upon the application of the signal to the first input and operable to change to a second binary state upon the application of the sampling signal to the second input after the elapse of a predetermined interval from the application of the signal to the first input.

4. An ink ejection system as claimed in claim 2, wherein the output pulse from said bistable device has a pulse duration which is an integral multiple of the half cycle of the sinusoidal signal.

5. An ink ejection system as claimed in claim 2, wherein said bistable device comprises a D flip-flop.

6. An ink ejection system as claimed in claim 2, wherein said modulating means comprises a gate-controlled bidirectional conducting device having its gate connected to receive said output pulse from the bistable device and its conducting path connected to pass said sinusoidal signal in response to the application of said output pulse to its gate.

7. An ink ejection system as claimed in claim 1, wherein said writing unit comprises a first chamber, a second chamber, a connecting channel communicating the first and second chamber, an inlet channel in communication with the second chamber for supplying therethrough the first chamber with liquid, an outlet channel in communication with the second chamber and in alignment with the connecting channel opposite to the electromechanical transducer.

* * * * *